United States Patent
Gao et al.

(10) Patent No.: US 9,638,028 B2
(45) Date of Patent: May 2, 2017

(54) ELECTROMAGNETIC TELEMETRY FOR MEASUREMENT AND LOGGING WHILE DRILLING AND MAGNETIC RANGING BETWEEN WELLBORES

(71) Applicant: Schlumberger Technology Corporation, Sugar Land, TX (US)

(72) Inventors: Guozhong Gao, Katy, TX (US); Luis E. Depavia, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 264 days.

(21) Appl. No.: 14/470,227

(22) Filed: Aug. 27, 2014

(65) Prior Publication Data

US 2016/0061027 A1    Mar. 3, 2016

(51) Int. Cl.
| | | |
|---|---|---|
| *E21B 47/12* | (2012.01) | |
| *G01V 3/02* | (2006.01) | |
| *G01V 3/08* | (2006.01) | |
| *G01V 3/28* | (2006.01) | |

(52) U.S. Cl.
CPC .............. *E21B 47/121* (2013.01); *G01V 3/28* (2013.01)

(58) Field of Classification Search
CPC .. G01V 3/00–3/40; E21B 47/00; E21B 47/01; E21B 47/02; E21B 47/022; E21B 47/02216; E21B 47/09; E21B 47/12; E21B 47/121; E21B 47/122; E21B 17/003; E21B 17/028
See application file for complete search history.

(56) References Cited

U.S. PATENT DOCUMENTS 4,181,014 A † 1/1980 Zuvela
6,075,462 A    6/2000 Smith
(Continued)

FOREIGN PATENT DOCUMENTS

WO     98-06924 A2    2/1998

OTHER PUBLICATIONS

Soulier, et al., "E.M. MWD Data Transmission Status and Perspectives", SPE-25686-MS, Society of Petroleum Engineers, SPE/IADC Drilling Conference, Amsterdam, Netherland, Feb. 22-25, 1993, pp. 121-128.

(Continued)

*Primary Examiner* — Huy Q Phan
*Assistant Examiner* — David Frederiksen

(57) ABSTRACT

A method for signal communication between a well drilling instrument and the Earth's surface includes generating an electromagnetic field in an instrument disposed in drill string used to drill a wellbore. The electromagnetic field includes encoded measurements from at least one sensor associated with the instrument. A signal corresponding to an amplitude of the electromagnetic field is measured and the measurements from the measured signal are decoded. The signal comprises a voltage measured across electrodes or a voltage induced in an electromagnetic receiver disposed at a selected depth below the Earth's surface. The selected depth is at least the depth of a formation below the water table having a highest resistivity within 500 meters of the surface.

19 Claims, 11 Drawing Sheets

(56) References Cited

U.S. PATENT DOCUMENTS

| | | | | |
|---|---|---|---|---|
| 6,160,492 | A * | 12/2000 | Herman | E21B 47/122 166/373 |
| 7,080,699 | B2 * | 7/2006 | Lovell | E21B 17/003 166/66.5 |
| 7,126,492 | B2 † | 10/2006 | Wisler | |
| 7,145,473 | B2 | 12/2006 | Wisler et al. | |
| 8,400,326 | B2 † | 3/2013 | Codazzi | |
| 8,618,803 | B2 * | 12/2013 | Rodney | G01V 3/26 324/326 |
| 2004/0149431 | A1 † | 8/2004 | Wylie | |
| 2008/0041626 | A1 * | 2/2008 | Clark | E21B 47/02216 175/45 |
| 2010/0155139 | A1 * | 6/2010 | Kuckes | E21B 47/02216 175/45 |
| 2011/0168446 | A1 | 7/2011 | Lamenager et al. | |
| 2012/0061143 | A1 * | 3/2012 | Hay | E21B 47/122 175/57 |
| 2013/0342354 | A1 | 12/2013 | Petrovic et al. | |
| 2016/0146000 | A1 * | 5/2016 | Logan | E21B 47/122 340/853.1 |

OTHER PUBLICATIONS

Spinnler, et al., "Mud Pulse Logging While Drilling Telemetry System-Design, Development, and Demonstrations", Paper presented at the IADC-CAODC Drilling Technology Conference in Houston, TX, Mar. 6-9, 1978, pp. 23.

International Search Report issued in related PCT application PCT/US2015/046941 on Oct. 26, 2015, 4 pages.

International Preliminary Report on Patentability issued in corresponding International application PCT/US2015/046941 on Mar. 9, 2017. 13 pages.

\* cited by examiner
† cited by third party

US 9,638,028 B2

ELECTROMAGNETIC TELEMETRY FOR MEASUREMENT AND LOGGING WHILE DRILLING AND MAGNETIC RANGING BETWEEN WELLBORES

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND

This disclosure is related to the field of measurement while drilling ("MWD") and logging while drilling ("LWD"). More particularly, the disclosure relates to improved electromagnetic telemetry techniques for communicating data between MWD and/or LWD instruments and the Earth's surface.

U.S. Patent Application Publication No. 2011/0168446A1 and U.S. Pat. No. 7,145,473B2 describe examples of electromagnetic telemetry for communicating signals between equipment disposed at the Earth's surface and LWD and/or MWD instruments in a wellbore. One type of electromagnetic telemetry known in the art includes a an electric dipole antenna formed by an insulated gap between conductive segments on a drill collar associated with the MWD and/or LWD instruments, or by a toroid disposed on the outer surface of the collar. A time varying voltage impressed across the insulated gap (or the toroid) generates an electromagnetic field which can be used to communicate between a surface electric dipole receiver antenna or a plurality of differently oriented electric dipole antennas and the MWD/LWD instrument. See the basic concept shown in FIG. 1. A surface transceiving sensor, i.e., a dipole antenna, may be composed of an electrode placed in the ground a selected distance from a drilling unit or "rig" and the well casing. The voltage between the electrode and the well casing is measured and signals from the MWD and/or LWD instruments encoded into the transmitted electromagnetic field are decoded from the measured voltages. Conversely, voltage imparted across the casing and electrode may induce an electromagnetic field in the subsurface that is detectable by the dipole antenna or toroid on the MWD/LWD instrument and internally decoded. The foregoing signal communication from wellbore to surface may be referred to as "uplink" communication and the surface to wellbore communication may be referred to as "downlink" communication.

Referring to FIG. 1, an electromagnetic telemetry system known in the art is shown to explain the basic components thereof. U.S. Patent Application Publication No. 2011/0168446A1 and U.S. Pat. No. 7,145,473B2 referred to above describe adaptations of the system shown in FIG. 1 and may be referred to for more details. A drilling unit or "rig" is shown generally at 28 and has equipment (not shown separately) to raise, lower and rotate a drill string 16 with a bottom hole assembly (BHA) 23 at its lower end. A drill bit 26 is disposed at the longitudinal end of the BHA 23 and is rotated, either by the drilling unit 28 and/or a motor (not shown) in the drill string 16 to axially extend the length of a wellbore 11. When the wellbore 11 is initialed drilled to a selected depth, a casing 14 may be inserted into the wellbore 11 and cemented in place. Drilling may then resume. The BHA 23 may include an MWD and/or LWD instrument, shown generally at 23A. The MWD/LWD instrument may be any type known in the art and may include sensors (not show separately) for measuring orientation of the BHA 23, as well as sensors for measuring shock and vibration of the BHA 23, and/or sensors for measuring one or more physical parameters of the formations (including conductive layers 16 and a reservoir formation 20) through which the instrument 23A passes during drilling and any subsequent movement within or along the wellbore 11. Such physical parameters may be of any kind known in the art, and may include, without limitation, electrical resistivity, acoustic velocity, natural gamma radiation, spectrally analyzed natural gamma radiation, density, neutron porosity and/or capture cross section, and nuclear magnetic resonance relaxation times. The foregoing are only examples and in no way are intended to limit the scope of the present disclosure.

In the present example circuitry (not shown) in the instrument 23A may be used to impart a time varying voltage across an insulating gap 24 disposed between conductive components 22, 22A of the instrument 23A. The circuitry (not shown) in the instrument 23A may include devices to encode measurements from the various sensors (not shown) in the instrument into the time varying voltage. The imparted voltage generates a time varying electromagnetic field in the formations 20, 16 which includes the encoded measurement data. In the present example, a voltage induced between an electrode 12 inserted into the ground at a selected distance from the drilling rig 28 and the casing 14 may be measured and decoded into data encoded into the time varying voltage by a surface measurement and decoding system, shown generally at 10 and which may be of any type known in the art.

However, the amplitude of the electromagnetic field induced by the instrument 23A is highly attenuated before it reaches the surface. Research has found that limiting factors for the received signal amplitude include the subsurface formation resistivity distribution, drilling fluid electrical resistivity and the depth of the MWD/LWD instrument in the wellbore. All of the foregoing may cause substantial transmitted signal attenuation such that reliable data communication may be difficult to obtain. Electromagnetic telemetry is preferred over drilling fluid flow modulation ("mud pulse") telemetry not only because it works in certain conditions where mud pulse telemetry does not, e.g., underbalanced drilling or when the gas or air is used as the drilling fluid, but more importantly, higher data communication rate can be achieved if the signal attenuation can be adequately reduced.

FIGS. 2A and 2B show examples of how conductive formations overlying the instrument (23A in FIG. 1), called "overburden", attenuate the amplitude of the voltage detectable at the surface. The attenuation is sensitive to the frequency of the time varying voltage imparted across the insulating gap (24 in FIG. 1) and thus, depending on certain conditions may limit the available rate at which data may be communicated between the surface and the instrument (23A in FIG. 1). Conductive drilling fluid in the wellbore and conductive formations are two of the most significant barriers to high data rate signal communication. FIG. 2A shows the case where the formations overlying the wellbore in which the MW/LWD tool have a resistivity of about 2 ohm-m, and FIG. 2B shows the case for overlying formations having resistivity of about 8 ohm-m.

SUMMARY

A method for signal communication between a well drilling instrument and the Earth's surface is disclosed. The method includes generating an electromagnetic field in an instrument disposed in a drill string used to drill a wellbore. The electromagnetic field includes encoded measurements from at least one sensor associated with the instrument. A signal corresponding to an amplitude of the electromagnetic field is measured. The measured signal is decoded. The signal includes at least one of a voltage imparted across a casing in the wellbore and an electrode disposed to a selected depth below the Earth's surface at a selected lateral distance from the casing, a voltage imparted across the casing in the second wellbore and a signal wire or an electrode disposed to a selected depth below the Earth's surface, a voltage imparted across an electrode tube and a signal wire disposed to a selected depth below the Earth's surface, a voltage induced in an electromagnetic receiver disposed at a selected depth below the Earth's surface. The electrode may be at least one of an electrical conductor, a casing of a second wellbore, and a signal wire disposed in a conduit. The selected depth is at least a bottom depth of a shallowest formation below a water table having a highest resistivity within 500 meters of the surface. The selected lateral distance is a distance from a drilling unit wherein electrical noise amplitude therefrom is reduced by at least a factor of two from the noise amplitude at a distance of 50 meters from the drilling unit.

A method for communication of signals between a wellbore drilling instrument and the Earth's surface is disclosed. The disclosed method includes generating an electromagnetic field in the wellbore drilling instrument disposed in a first wellbore. The electromagnetic field includes encoded signals corresponding to measurements of at least one sensor associated with the instrument. The disclosed method also includes detecting the electromagnetic field using at least one electromagnetic receiver disposed in a second wellbore proximate the first wellbore. The electromagnetic receiver is in electrical communication with the Earth's surface using an electrical cable. The disclosed method also includes transmitting a signal to the Earth's surface corresponding to the detected electromagnetic field along the electrical cable.

A system for communication between a wellbore instrument and the Earth's surface is also disclosed. The system includes an electromagnetic field generator associated with the wellbore instrument, an electromagnetic field detector in signal communication with the Earth's surface, and a voltage measuring system disposed at the Earth's surface and in signal communication with the electromagnetic field detector. The electromagnetic field generator is configured to encode measurements made by at least one sensor associated with the wellbore instrument. The electromagnetic field detector includes at least one of a casing in the wellbore and an electrode disposed to a selected depth below the Earth's surface at a selected lateral distance from the casing, the casing in the second wellbore and a signal wire or an electrode disposed to a selected depth below the Earth's surface, an electrode tube and a signal wire disposed to the selected depth, and an electromagnetic receiver disposed at the selected depth. The electrode includes at least one of an electrical conductor, a casing of a second wellbore, and a signal wire disposed in a conduit. The selected depth is at least a bottom depth of a shallowest formation below a water table having a highest resistivity within 500 meters of the surface. The selected lateral distance is a distance from a drilling unit from which the electrical noise amplitude is reduced by at least a factor of two from the noise amplitude at a distance of 50 meters from the drilling unit.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

One aspect of the disclosure relates to a method and a system which may substantially expand the applicability of electromagnetic (EM) telemetry for communication between wellbore drilling instruments and the Earth's surface. A method and system according to this aspect of the disclosure may use a conductive electrode or a telemetry well, and/or a signal wire. The electrode, telemetry well or signal wire is disposed in the subsurface and may be adjacent or proximate to the well(s) being drilled. The electrode, telemetry well or signal wire may be long enough so that it penetrates a specific formation layer, which may be a conductive formation layer proximately above or below reservoir formation layer(s) and proximate to the electromagnetic telemetry transceiver on the MWD and/or LWD instrument(s) in the wellbore of interest. The electrode, telemetry well or signal wire may be at least partially insulated along its length to reduce current leaking into the surrounding formations along the length of the electrode, well or wire. The electrode, telemetry well or signal wire works in one of the following ways to minimize signal attenuation and/or noise: (1) the electrode (or telemetry well or signal wire) itself can provide an electrically conductive channel to the Earth's surface, which may substantially enhance the measurable signal at the surface by bypassing electrically conductive overburden formations; (2) a signal wire which is placed inside an electrode and electrically insulated from the electrode may be used to communicate signal from the MWD/LWD instrument to the surface either by measuring the voltage between the wire and the electrode, or measuring the voltage between the signal wire and the well casing. Measuring the voltage between the signal wire and the electrode may reduce the effects of electrical noise generated by the drilling rig; (3) the signal wire may be electrically coupled to an active electromagnetic receiving or transceiving device disposed at the bottom of the electrode or telemetry well and transmit the detected signals between the instrument and the surface using the signal wire as a communication channel. The foregoing methods may be particularly useful when many wells are expected to be drilled proximate to the electrode or telemetry well.

Figure 1:
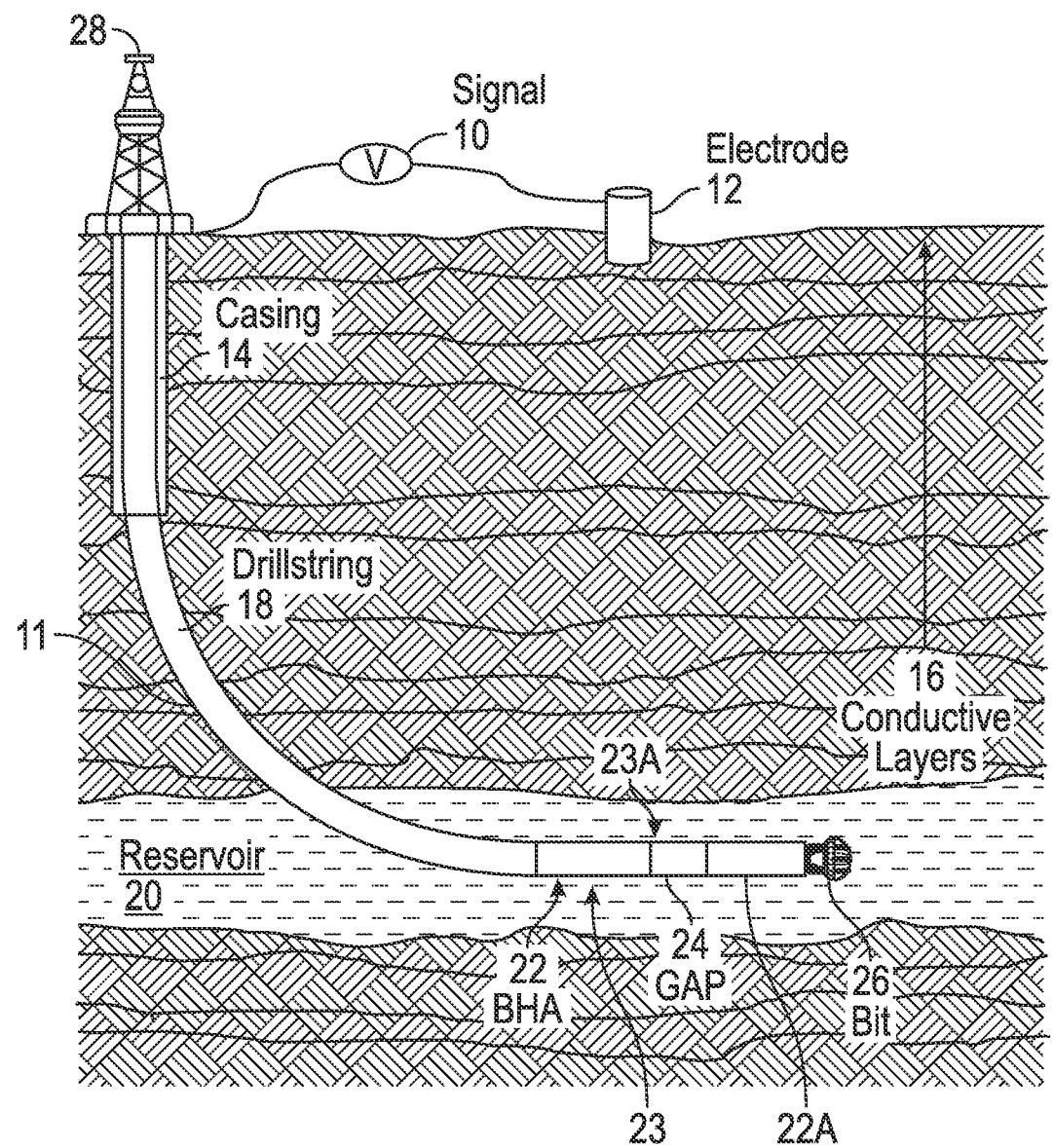
FIG. 1 shows an electromagnetic telemetry system known in the art prior to the present disclosure.
Figures 2A, 2B:
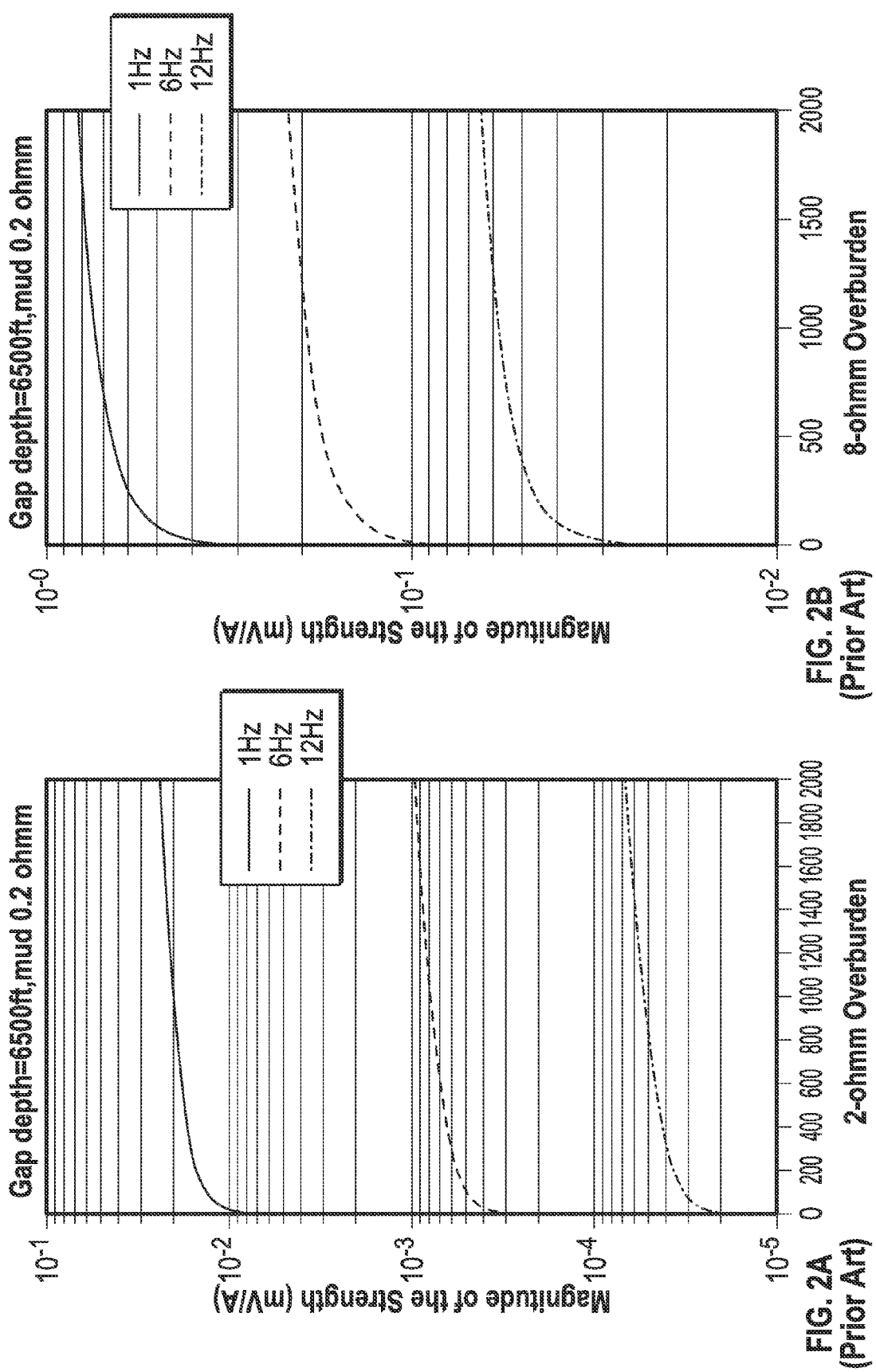
FIGS. 2A and 2B show, respectively, attenuation of transmitted telemetry signal at various frequencies by overburden formation at a telemetry transmitter depth of 6,500 feet for overburden resistivity of 2 ohm-m and 8 ohm-m.
Figure 3:
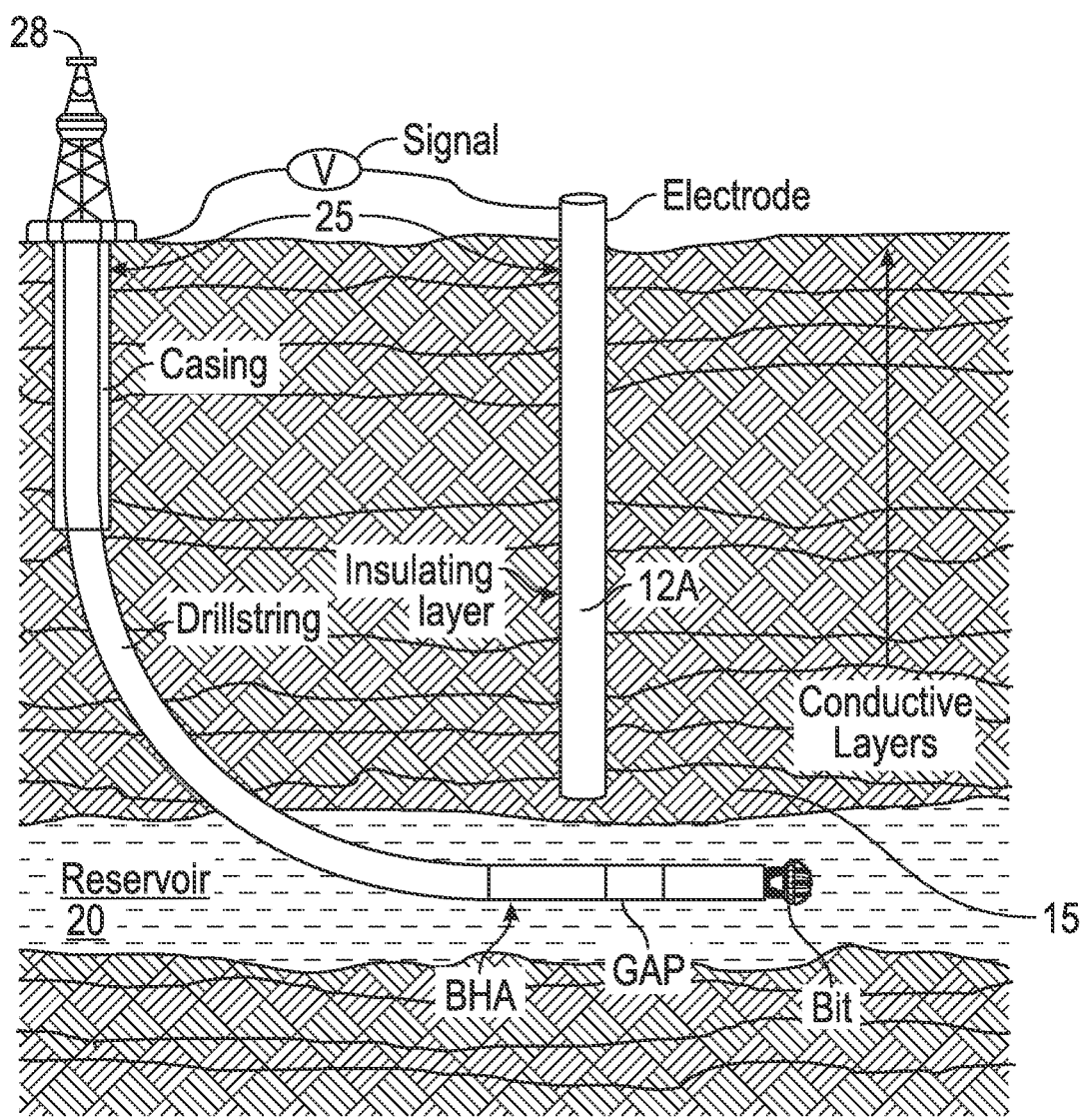
FIG. 3 shows one example of an electrode used in electromagnetic telemetry according to the present disclosure.

FIG. 3 shows one example embodiment of an EM telemetry system which puts a long electrode 12A as deep as possible into the subsurface formations. In the present example, the wellbore 11 may be drilled substantially parallel to the geologic attitude of the reservoir formation 20. The electrode 12A may contact the formation layer 15 right above the reservoir 20, assuming that the formation layer is more electrically conductive that the reservoir formation 20. In such way, the electrode 12A can provide a conductive channel for electrical current to flow to the surface. The electrode 12A may be insulated on its exterior surface down to its lower end, where it is in electrical contact with the formations. Such insulation may be provided to prevent current leaking into the formations. Voltage may be detected by the surface measurement and decoding system 10 between the electrode 12A and the well casing 14 as explained with reference to FIG. 1. In the present example, the electrode 12A may be in any form as long as it is made from electrically conductive material, e.g., metal. For example, the electrode 12A may be a rod, a tube or even a well casing (as will be explained with reference to FIGS. 5, 6 and 8). In some examples, the electrode 12A may have a minimum vertical length (thus being disposed to a corresponding selected depth) such that the electrode 12A penetrates (i.e., passes through a bottom depth of) the shallowest subsurface formation (first occurring with respect to depth from the surface) below the local water table (i.e., the depth of the water table proximate the wellbore 11) and having the highest resistivity within 500 meters of the surface. Such minimum length may be expected to enable the detected voltage to be substantially larger and the rig noise to be significantly lower than using the surface electrode shown at 12 in FIG. 1, without the need to extend the electrode 12A to the conductive layers 16 of the formation 15 just above the reservoir formation 20.

In the example embodiment of FIG. 3, a lateral spacing or distance 25 between the electrode 12A and the well casing 14 may be selected such that a measured electrical noise amplitude is reduced by a factor of at least 2 from a measured noise amplitude at a distance of 50 meters from the well casing 14. By selecting such lateral spacing, electrical noise sources from the drilling rig 28 may be reduced to a level that may prevent substantial interference with detection of the telemetry signal by reason of interference from electrical noise sources at the drilling rig 28.

Figure 4:
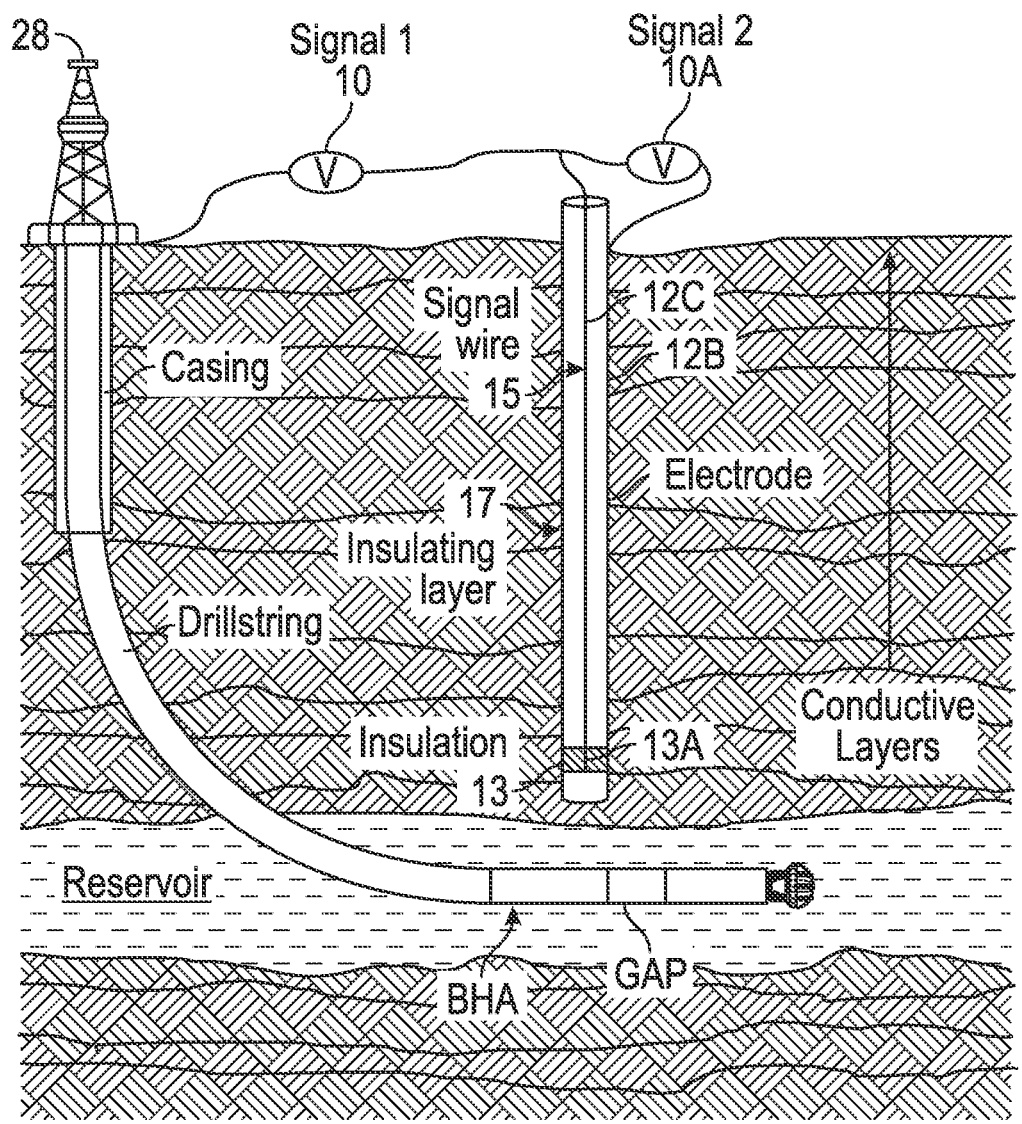
FIG. 4 shows an example of an insulated signal wire disposed in an electrode tube.

FIG. 4 shows another example EM telemetry system which also includes an electrode disposed deep into the formations (or having an example minimum vertical depth as explained with reference to the prior example). In the present example, a terminal 13A which is electrically insulated (by insulation 13) from the electrode 12A may be attached proximate the bottom of the electrode 12A. An insulated signal wire 12C placed in the interior of the electrode 12A may be connected to the terminal 13A and may extend to the surface. Two separate measurements may be made for this arrangement: one may be the voltage between the signal wire 15 and the well casing as may be measured in the surface measurement and control unit 10; the other voltage may be measured between the signal wire 15 and the electrode 12A. The latter voltage, shown measured at 10A may be expected to be substantially less affected by electrical noise from the drilling rig 28 than the signal measured between the signal wire 15 and the casing 14. In the present example, the electrode 12A may include an insulating layer 17 disposed about its exterior to a position proximate the lower end of the electrode 12A, where electrical contact with the formations may be made. The depth and lateral distance for the electrode 12A and terminal 13A may be selected in a manner similar to that explained with reference to the example embodiment shown in FIG. 3.

In some examples, the electrode 12A may be in contact with conductive formations, shown generally at 16 disposed above the reservoir formation 20. In such examples, where the wellbore 11 is drilled substantially parallel to the reservoir formation 20, the deepest conductive formation 15 (i.e., having an electrical resistivity lower than the reservoir formation) thereabove (or below) may provide an electrically conductive path to the electrode 12A and/or the terminal 13A so that a relatively high amplitude signal voltage may be measured even as the instrument 23A moves along the reservoir formation 20, that is, the conductive formation 16 enables good electrical communication with the instrument 23A even if the electrode 12A and/or terminal 13A are not located directly vertically above the instrument 23A. As in the previous example, and in examples to follow, downlink communication may be performed by imparting a time varying voltage, such as may be generated within the measurement and control unit 10, between the well casing 14 and the terminal 13A or electrode 12A, or between the terminal 13A and the electrode 12A to induce an electromagnetic field in the formations detectable by the instrument 23A. Such detection may be in the form of a voltage impressed across the insulating gap 24 or in a toroid (not show) for EM telemetry MWD/LWD instruments so configured.

Figure 5:
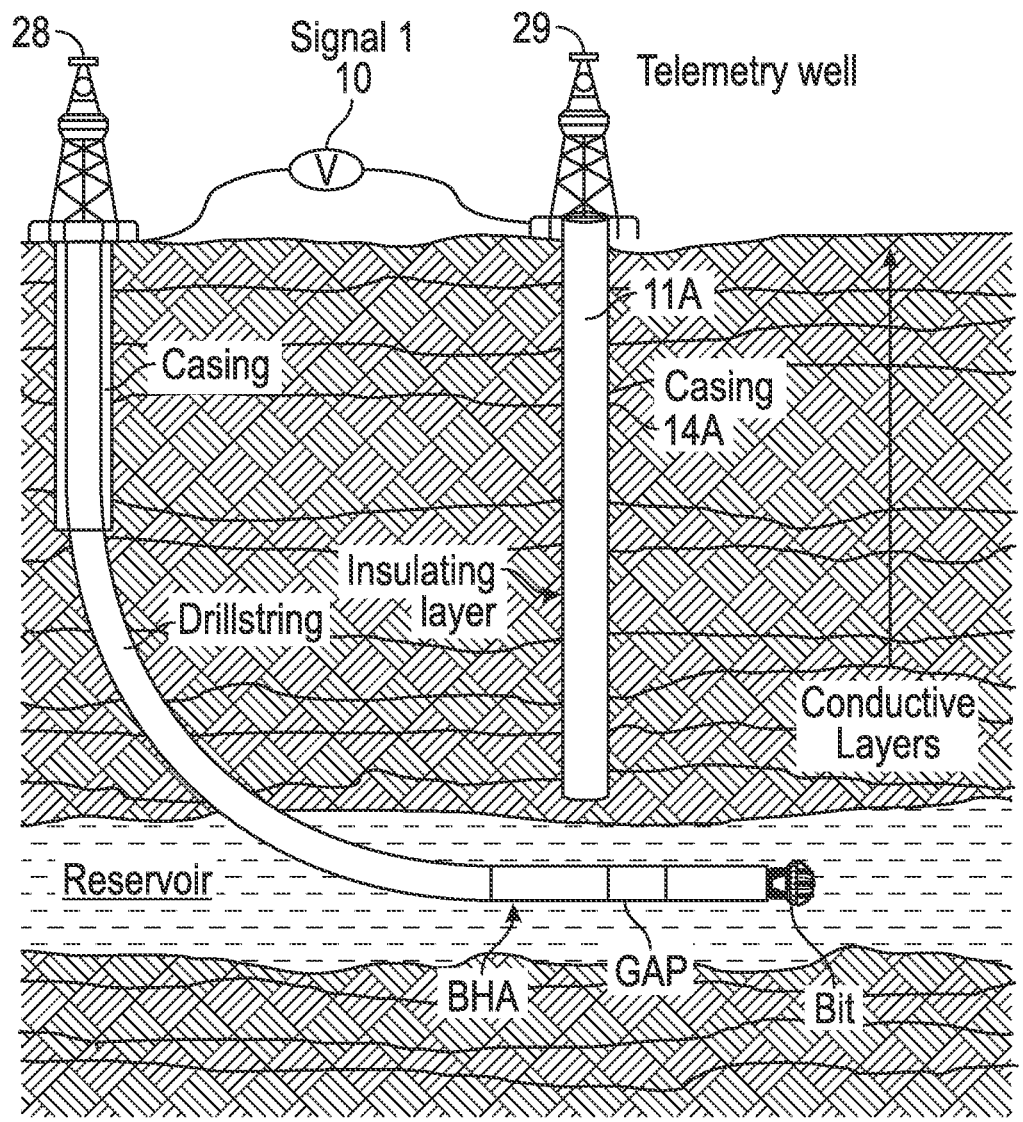
FIG. 5 shows an example of a telemetry well being drilled or having been drilled above a zone being drilled by a well using an electromagnetic telemetry transceiver.

FIG. 5 shows another example EM telemetry system which is similar to that shown in FIG. 3. In the system shown in FIG. 5, a telemetry well 11A drilled by a second drilling unit 29 may have a casing 14A or tubing disposed therein. The casing or tubing 14A may be set to a selected depth in the telemetry well 11A, just as the electrode 12A in FIG. 3. Voltage may be measured between the telemetry well casing 14A and the wellbore casing 14. The depth considerations for the casing 14A in the telemetry well 11A may be similar to those for the electrode shown in FIG. 3. In the present example, the telemetry well 11A may be a pilot well for a plurality of "lateral" wellbores (not shown) that may be ultimately drilled through the same reservoir formation 20 as the wellbore 11 described above. Using a system as shown in FIG. 5 it may be possible to communicate higher frequency EM telemetry signals between the instrument 23A and the surface over a relatively large area of the subsurface traversed by such multiple lateral wellbores drilled through the reservoir formation 20 by using additional pilot wells (not shown) as electrodes in the manner shown in FIG. 5. A depth of the casing 14A and the lateral spacing from the drilling wellbore casing 14 may be based on the requirements of drilling lateral wells therefrom into the reservoir formation 20, however the minimum depth to which the casing 14A is set, and its minimum lateral spacing from the casing 14 in the drilling wellbore 11 may be selected as explained above with reference to FIG. 3.

Figure 6:
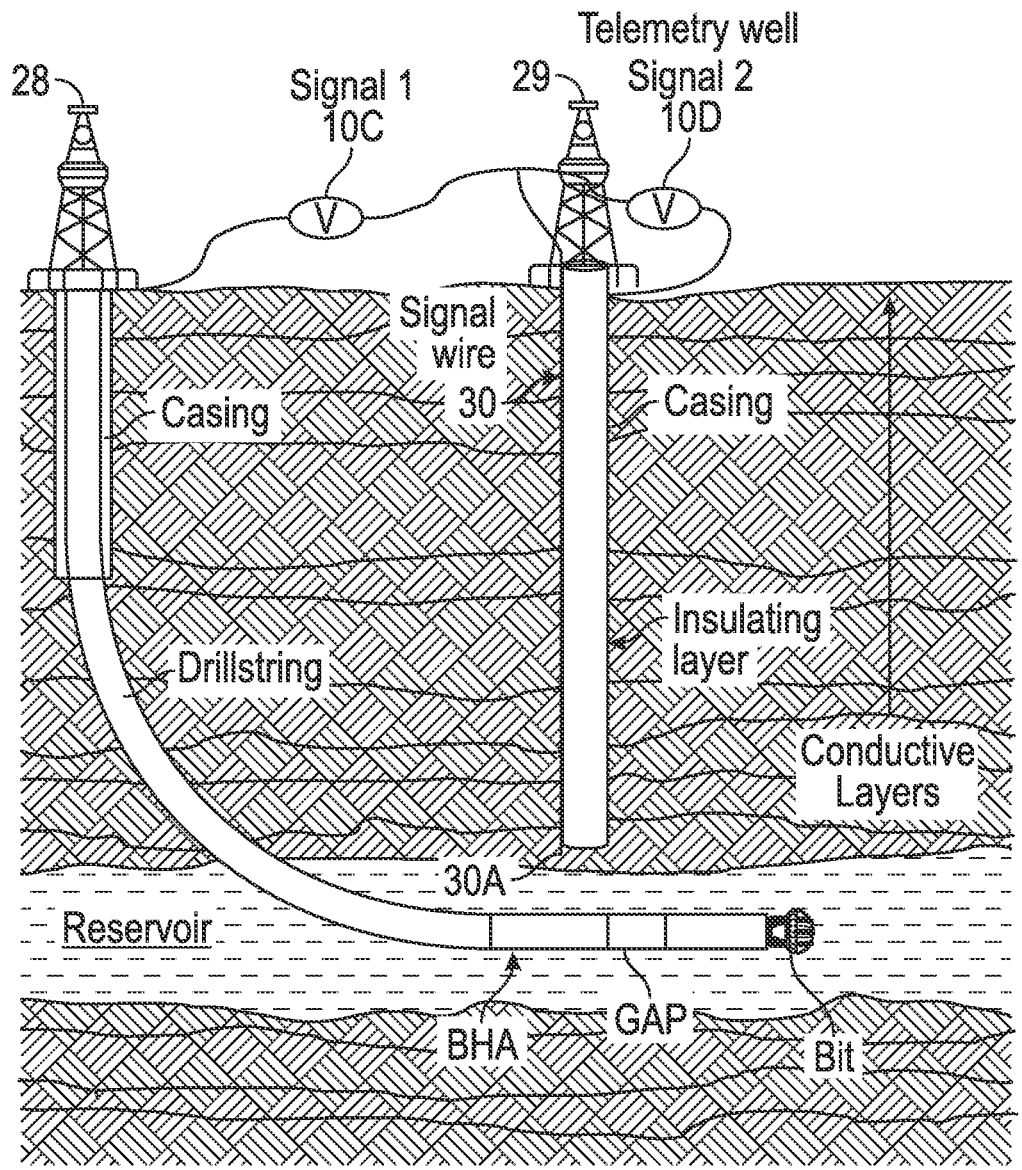
FIG. 6 shows another example of a telemetry well having a signal wire disposed outside the well casing.

FIG. 6 shows another example in which an insulated signal wire 30 may be disposed externally to the casing 14A in the telemetry well 11A. The insulated signal wire 30 may be permanently emplaced with the casing 14A, and may have an electrically conductive end 30A exposed proximate the bottom end of the casing 14A. In the example of FIG. 6, two different voltages may be measured. A first voltage 10C may be measured (e.g., in the measurement and control unit 10 in FIG. 1) between the wellbore casing 14 and a surface end of the insulated signal wire 30, and a second voltage 10D measured between the telemetry well casing 14A and the surface end of the insulated signal wire 30. It will be appreciated by those skilled in the art that the lateral spacing between the voltage measurement points in the subsurface is relatively small for the second voltage measurements (10A in FIGS. 4 and 10D in FIG. 6) but it may be expected that the voltage amplitude will still be relatively high because of the proximity of the measurement points to the instrument 23A in the wellbore 11 and the elimination of a substantial portion of the overburden. A depth of the casing 14A and the signal wire 30 and the lateral spacing thereof from the drilling wellbore casing 14 may be based on the requirements of drilling lateral wells therefrom into the reservoir formation 20, however the minimum depth to which the casing 14A and signal wire 30 are set, and their minimum lateral spacing from the casing 14 in the drilling wellbore 11 may be selected as explained above with reference to FIG. 3.

Figure 7:
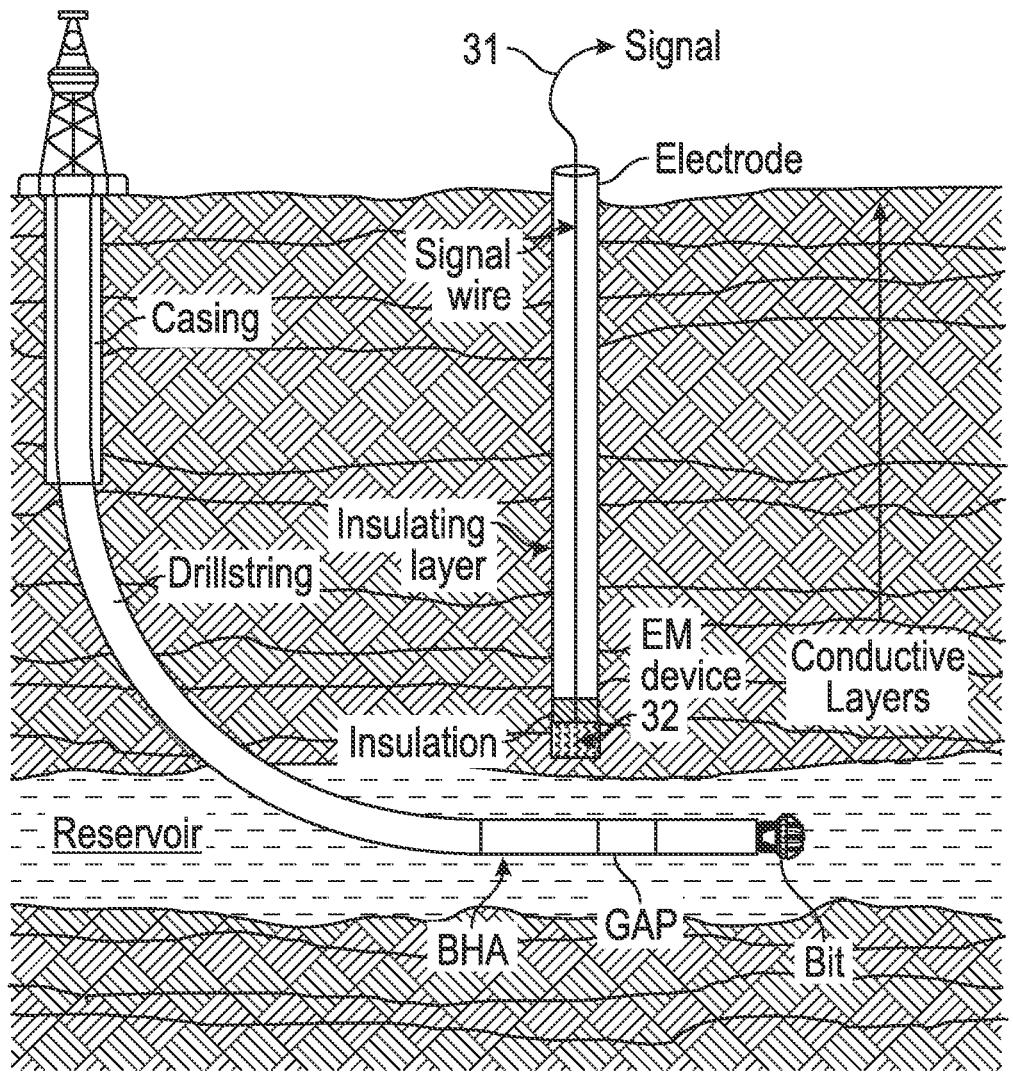
FIG. 7 shows an electromagnetic transceiver disposed in an electrode tube or well, wherein wired communication between the transceiver and the surface is performed using electrical cable as a communication channel.

FIG. 7 shows an example EM telemetry system in which the electrode 12A is in the form of a tube or conduit and may contain an insulated electrical cable 31 therein. The insulated electrical cable 31 may be connected to an electromagnetic receiver or transceiver 32 disposed at the bottom of the electrode 12A. The receiver or transceiver 32 may detect signals from the instrument 23A (and/or may transmit EM signals to the instrument 23A). The minimum depth of the receiver or transceiver 32 and the minimum lateral spacing from the drilling well casing 14 may be selected as explained with reference to FIG. 3.

Figure 8:
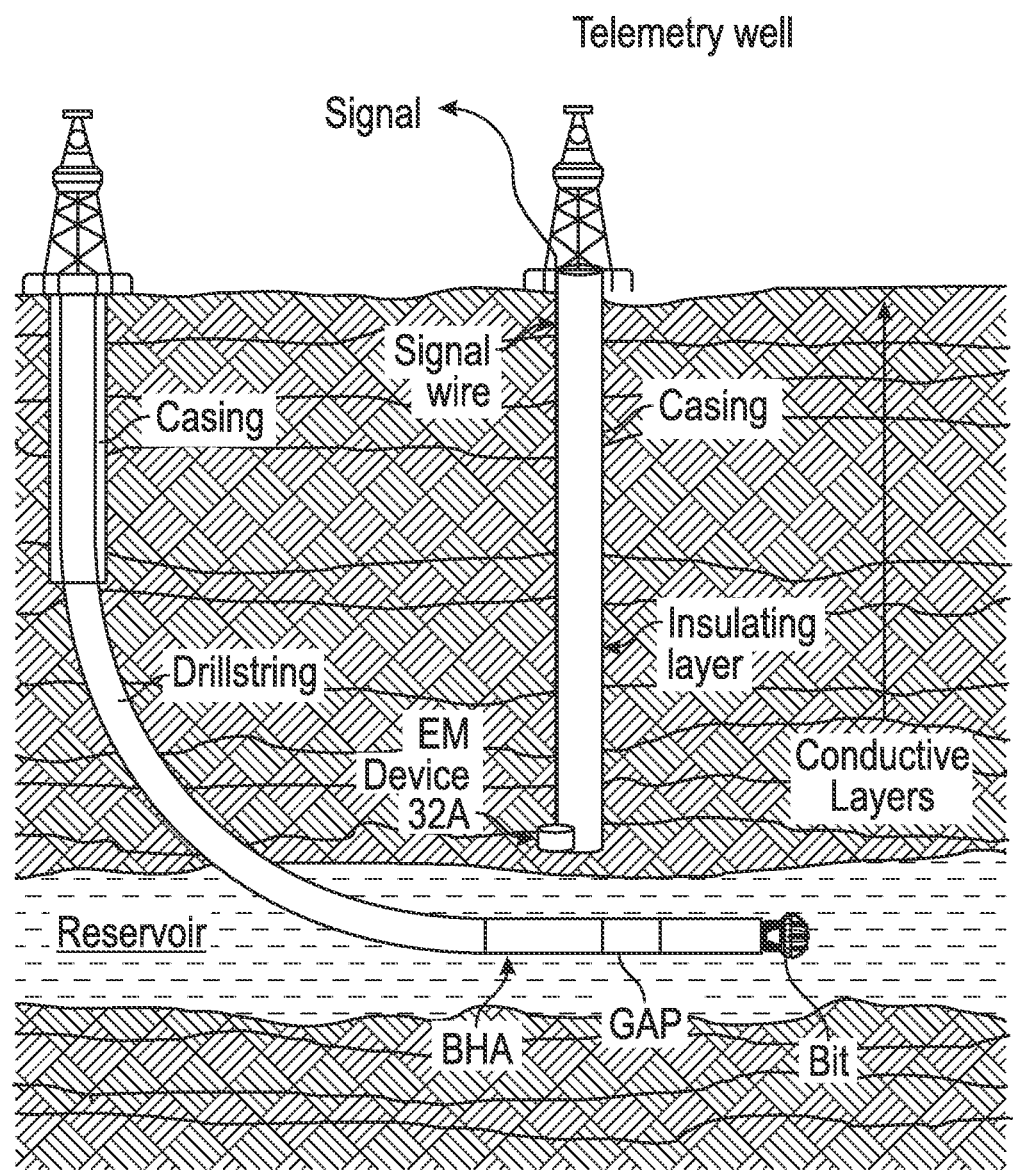
FIG. 8 shows an example of an electromagnetic transceiver as in FIG. 7, but disposed externally to a casing of a telemetry well.

FIG. 8 shows an example EM telemetry system similar in configuration to the one shown in FIG. 7, however in FIG. 8, the EM receiver or transceiver 32A may be disposed outside the telemetry well casing 14A and connected to the surface using an insulated electrical cable 31 as shown in FIG. 7. The minimum depth of the receiver or transceiver 32A and the minimum lateral spacing from the drilling well casing 14 may be selected as explained with reference to FIG. 3.

In the example implementations shown in FIGS. 7 and 8, the EM receiver or transceiver 32, 32A may be simply a detector, such as dipole antenna, solenoid antenna or magnetometer and communicate detected signals (e.g., in the form of voltage) directly to the surface using the electrical cable 31 as a signal communication channel. In other embodiments, the detector may be coupled to power operated circuits (not shown) that may condition and amplify the signals detected by the detector before communication thereof along the signal wire 31. In such examples, the electrical cable 31 may include additional insulated electrical conductors to transmit electrical power from the surface to the circuits (not shown) in the EM receiver or transceiver 32, 32A. The receiver or transceiver may be used either to simply detect signals transmitted by the instrument 23A and transmit them to the surface, or may communicate signals between the surface and the instrument 23A.

All the foregoing example systems may be used in multi-well drilling environments to maximize the usage of the electrode or the telemetry well. The telemetry well may be converted to a producing well, e.g., by drilling one or more lateral wells in the reservoir formation(s) (e.g., 20 in FIGS. 3 through 7) after other the wells are drilled to minimize the economic burden of drilling a for-purpose telemetry well.

In another aspect, the present disclosure relates to magnetic ranging between wells. Several magnetic ranging techniques are known in the art. One magnetic ranging method is the so-called "active" ranging method which places one or more magnetic transmitters in a completed or producing well and measures the magnetic fields in a drilling well using magnetometers in the drilling well (in a MWD and/or LWD instrument); or conversely, places transmitters in the drilling well BHA and the magnetic field amplitude may be measured in the completed or producing well. Another magnetic ranging method is the so-called "passive" method, which uses pre-magnetized casing in the completed or producing well, and makes magnetic field measurements in the drilling well, e.g., using magnetometers in the BHA (e.g. in MWD or LWD instrumentation as described above), wherein part of the measured magnetic field originates from the pre-magnetized casing. The foregoing methods require effective data communication between the drilling BHA and the surface. In such cases electromagnetic telemetry between instruments in the drilling BHA and instruments in adjacent or nearby wellbores, similar to the electromagnetic telemetry techniques described above may be used effectively.

Figure 9:
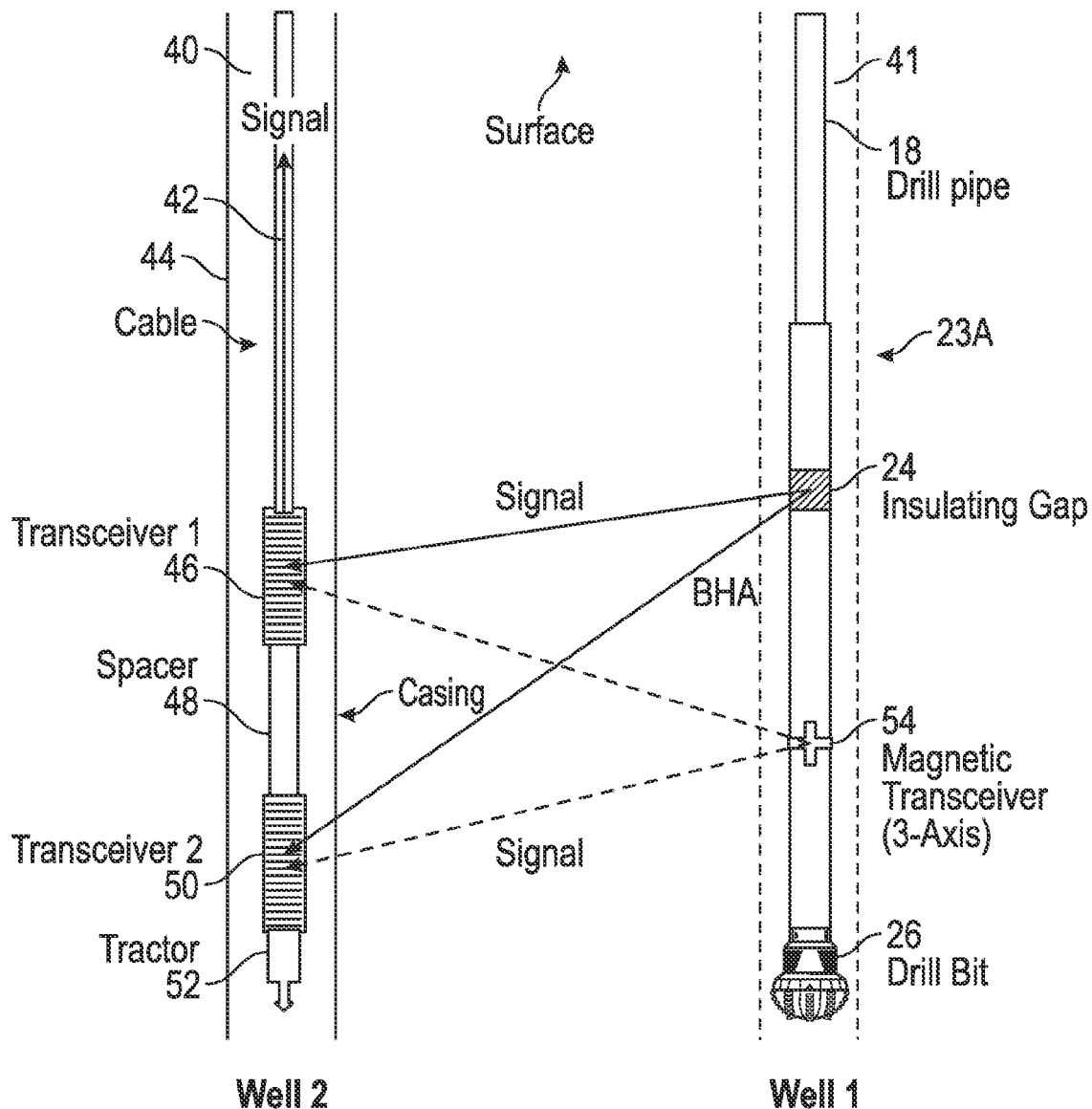
FIG. 9 shows an example of electromagnetic telemetry between a MWD/LWD tool and one or more electromagnetic transceivers disposed in a nearby well, wherein the one or more transceivers are coupled to an electrical cable as a communication channel.

Referring to FIG. 9, for the above mentioned active ranging method, a coil-tubing or tractor 52 may be used to transport one or more transceivers 46, 50 (spaced apart by a spacer 48) in a reference or first well 40 in the magnetic ranging process. The transceivers 46, 50 may be coupled to an armored electrical cable 42 such as will be familiar to those skilled in the art as a "wireline." The coiled tubing or tractor 52 may be used in cases where gravity is not able to move the transceivers 46, 50 and spacer 48 to the bottom of the first well 40 due to its inclination. However, the use of a tractor or coiled tubing to convey the transceivers 46, 50 in the first well 40 is not a limitation on the scope of the present disclosure. In the present example, the first well may include a casing 44.

Figure 10:
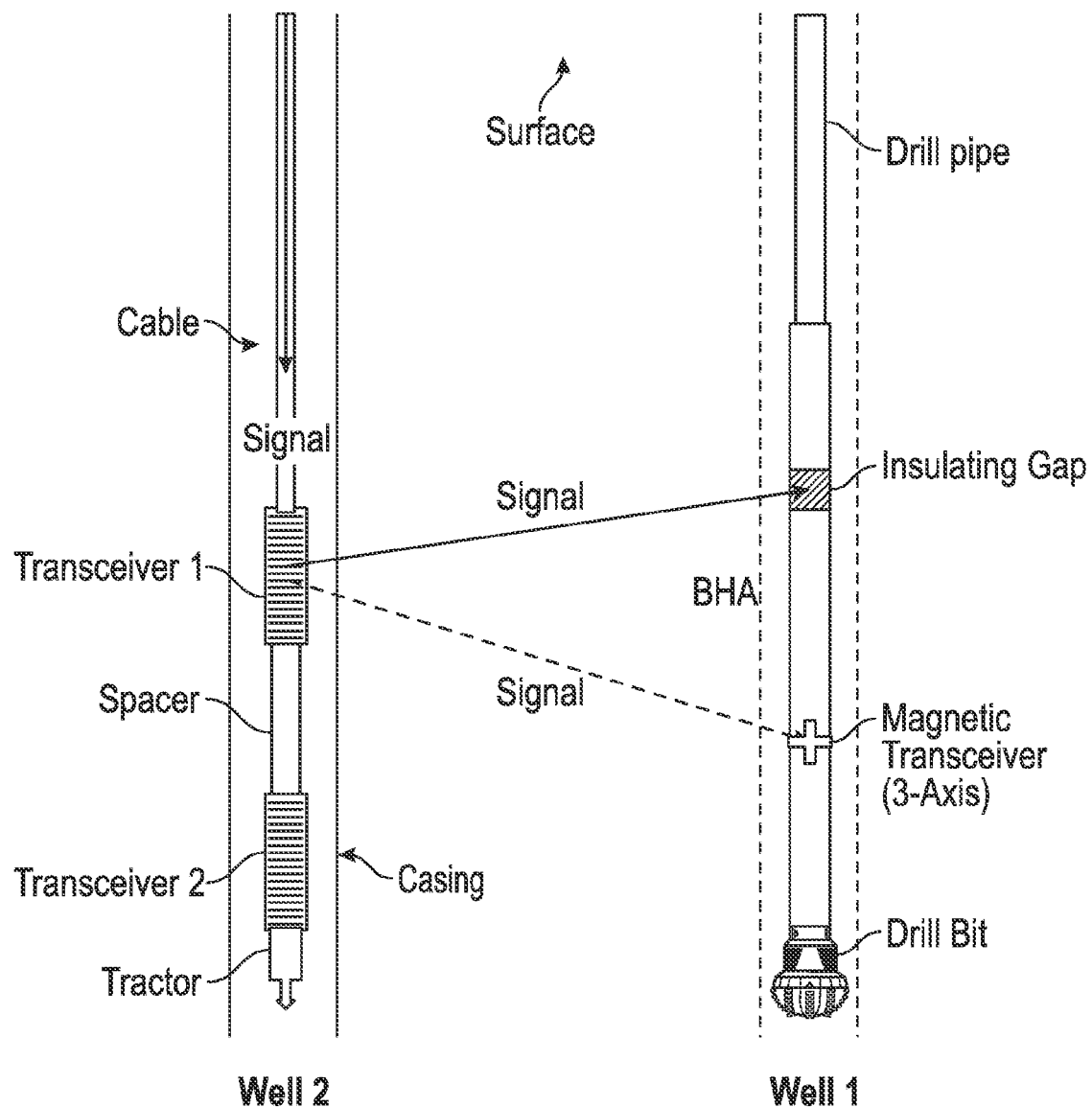
FIG. 10 shows an example of electromagnetic telemetry between a MWD/LWD tool and one or more electromagnetic transceivers disposed in a nearby well for magnetic ranging.

A proximate or adjacent wellbore 41 may be under active drilling operations. In the present example, an instrument 23A similar in configuration to the one shown in FIG. 1 may include a dipole antenna formed by conductive segments of a drill collar separated by an insulating gap 24 just as explained with reference to FIG. 1. Imparting time varying voltage across the insulating gap 24 may induce an electromagnetic field which may be detected by either of the transceivers 46, 50 in the first well 40. Conversely, electromagnetic signals generated by either or both of the transceivers 46, 50 in the first well may induce a time varying voltage across the insulating gap 24 in the instrument 23A in the drilling well 41. Thus, instruments in each wellbore 40, 41 are capable of transmitting and receiving EM signal. For uplink communication, as shown in FIG. 9, the EM signal generated by the instrument 23A and/or 54 in the drilling well may be detected by either or both of the transceivers 46, 50 in the first well 40. The detected signals may be communicated to the surface using the electrical cable 42. For downlink communication, as shown in FIG. 10 a signal from the surface may be first transmitted to the transceiver(s) in the first well 40 through the electrical cable 42, then either or both the transceivers 46, 50 may transmit the signal. The transmitted signal may be received by magnetic transceiver(s) 54 or across the insulating gap 24 in the instrument 23A in the drilling well 41. The telemetry frequency may or may not be the same as the magnetic ranging signal frequency. The frequency can be as high as several hundred Hz if the first well casing 44 is steel casing, and may be several thousand Hz if the first well 40 is not cased. By using the electrical cable 42 to transmit detected data signals to the surface, data transmission rates of megabits per second can be obtained between the transceivers 46, 50 and the surface without a limitation resulting from the formation resistivity distribution and depth. With reference to FIGS. 9 and 10, wellbore instruments known in the art may be used without modification or with only minor modification. For the passive ranging method, one of the transceivers may emit a selected frequency magnetic field, which may be detected by the magnetic transceivers (54 in FIG. 10) in the drilling well 41. Based on the measurements of the magnetic field made in the drilling well 41, a distance between the first well 40 and the drilling well 41 may be determined by circuits (not shown) in the instrument 23A and then the above described uplink telemetry technique may be used to communicate the determined distance (range) to the Earth's surface.

Figure 11:
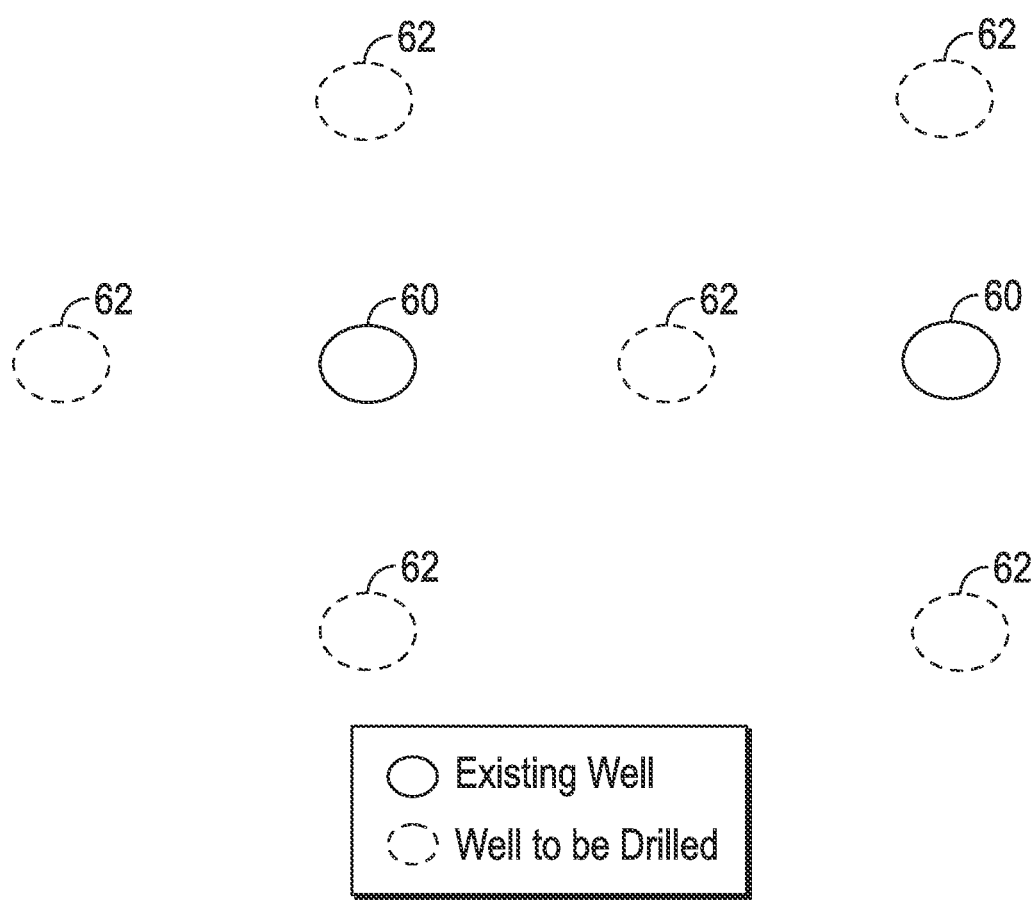
FIG. 11 shows an example of existing wells in which an electromagnetic transceiver may be inserted using electrical cable, and wells to be drilled adjacent or proximate thereto using electromagnetic telemetry in a BHA as shown in FIGS. 9 and 10.

For any type of ranging application and MWD/LWD, as shown in FIG. 11, if one or more certain wells 60 are already drilled, a transceiver device can be lowered into such well(s) 60 substantially as shown in well 40 in FIGS. 9 and 10. Proposed wells 62 proximate to or adjacent to the existing well(s) 60 may be drilled with effective EM telemetry as shown in and explained with reference to FIGS. 9 and 10. The foregoing procedure may be applied iteratively, and as many wells as possible may be drilled accordingly.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for signal communication between a well drilling instrument and the Earth's surface, comprising:
   generating an electromagnetic field in an instrument disposed in a drill string used to drill a wellbore, the electromagnetic field comprising encoded measurements from at least one sensor associated with the instrument;
   measuring a signal corresponding to an amplitude of the electromagnetic field; and
   decoding the measurements from the measured signal, wherein the signal comprises at least one of;
      a voltage imparted across a casing in the wellbore and an electrode disposed to a selected depth below the Earth's surface at a selected lateral distance from the casing, wherein the electrode comprises at least one of an electrical conductor, a casing of a second wellbore, and a signal wire disposed in a conduit,
      a voltage imparted across a casing in a second wellbore and a signal wire or an electrode disposed to a selected depth below the Earth's surface,
      a voltage imparted across an electrode tube and a signal wire disposed to a selected depth below the Earth's surface, and
      a voltage induced in an electromagnetic receiver disposed at a selected depth below the Earth's surface
   wherein the selected depth is at least a bottom depth of a shallowest formation below a water table having a highest resistivity within 500 meters of the surface and wherein the selected lateral distance comprises a distance from a drilling unit wherein electrical noise amplitude therefrom is reduced by at least a factor of two from the noise amplitude at a distance of 50 meters from the drilling unit.

2. The method of claim 1 wherein the selected depth below the Earth's surface comprises a depth of a deepest electrically conductive formation disposed above or below a reservoir formation.

3. The method of claim 1 wherein the generating an electromagnetic field comprises imparting a time varying voltage across in insulating gap between electrically conductive components of the instrument.

4. The method of claim 1 further comprising:
   inducing an electromagnetic field in the Earth's subsurface, the electromagnetic field comprising an encoded signal;
   detecting the electromagnetic field in an instrument disposed in a wellbore being drilled through subsurface formations; and
   decoding the signal in the instrument, wherein the detecting the electromagnetic field comprises measuring a voltage induced across an insulating gap between electrically conductive parts of the instrument, and wherein the inducing an electromagnetic field comprising applying a time varying voltage to at least one of;
      a casing in the wellbore and an electrode disposed to the selected depth and at the selected distance from the casing, wherein the electrode comprises at least one of an electrical conductor, a casing of a second wellbore, and a signal wire disposed in a conduit,
      the casing in the second wellbore and a signal wire or an electrode disposed to the selected depth,
      an electrode tube and a signal wire disposed to the selected depth, and
      an electromagnetic receiver disposed at the selected depth.

5. A method for communication of signals between a wellbore drilling instrument and the Earth's surface, comprising:
   generating an electromagnetic field in the wellbore drilling instrument disposed in a first wellbore, the electromagnetic field comprising encoded signals corresponding to measurements of at least one sensor associated with the instrument;
   detecting the electromagnetic field using at least one electromagnetic receiver disposed in a second wellbore proximate the first wellbore, wherein the at least one electromagnetic receiver is in electrical communication with the Earth's surface using an electrical cable and is disposed at a depth below a water table having a highest resistivity within 500 meters of the surface; and
   transmitting a signal to the Earth's surface corresponding to the detected electromagnetic field along the electrical cable.

6. The method of claim 5 further comprising transmitting a magnetic field from the second well; detecting an amplitude of the magnetic field using a sensor in the instrument in the first well; determining a distance between the first well and the second well using the detected amplitude; and encoding the generated electromagnetic field to include a signal corresponding to the determined distance.

7. The method of claim 6 wherein the transmitted magnetic field comprises applying electrical current to an electromagnetic transceiver disposed in the second well.

8. The method of claim 6 wherein the transmitted magnetic field comprises including at least one segment of a magnetized casing in a wellbore casing disposed in the second well.

9. The method of claim 6 wherein the sensor comprises a multiaxial magnetometer.

10. The method of claim 5 further comprising generating an electromagnetic field in the second wellbore by passing electrical current through an electromagnetic transceiver disposed in the second well, the current conducted along the electrical cable, the electromagnetic field comprising an encoded signal; detecting the generated electromagnetic field from the second well in the instrument in the first wellbore; and decoding the encoded signal in the instrument in the first wellbore.

11. The method of claim 10 wherein the detecting the electromagnetic field in the first wellbore comprises measuring a voltage induced across an insulating gap between electrically conductive parts of the instrument.

12. A system for communication between a wellbore instrument and the Earth's surface, comprising:
- an electromagnetic field generator associated with the wellbore instrument, the electromagnetic field generator configured to encode measurements made by at least one sensor associated with the wellbore instrument; and
- an electromagnetic field detector in signal communication with the Earth's surface, the electromagnetic field detector comprising at least one of:
  - a casing in the wellbore and an electrode disposed to a selected depth below the Earth's surface at a selected lateral distance from the casing, wherein the electrode comprises at least one of an electrical conductor, a casing of a second wellbore, and a signal wire disposed in a conduit,
  - a casing in a second wellbore and a signal wire or an electrode disposed to a selected depth below the Earth's surface,
  - an electrode tube and a signal wire disposed to a selected depth below the Earth's surface,
  - an electromagnetic receiver disposed at the selected depth; and
- a voltage measuring system disposed at the Earth's surface and in signal communication with the electromagnetic field detector;
- wherein the selected depth is at least a bottom depth of a shallowest formation below a water table having a highest resistivity within 500 meters of the surface; and
- wherein the selected lateral distance comprises a distance from a drilling unit wherein electrical noise amplitude therefrom is reduced by at least a factor of two from the noise amplitude at a distance of 50 meters from the drilling unit.

13. The system of claim 12 further comprising:
- an electromagnetic field generator associated with the voltage measuring system, the electromagnetic field generator associated with the voltage measuring system configured to encode a signal in an electrical current generated thereby and in signal communication with the electromagnetic field detector; and
- an electromagnetic field detector associated with the wellbore instrument, the wellbore instrument configured to decode the encoded signal in the electrical current.

14. The system of claim 12 wherein the electromagnetic field generator associated with the wellbore associated with the wellbore instrument comprises an insulating gap disposed between electrically conductive parts of the wellbore instrument.

15. The system of claim 12 wherein the selected depth below the Earth's surface comprises a depth of an electrically conductive formation disposed above or below a reservoir formation.

16. The system of claim 12 further comprising at least one electromagnetic transceiver disposed in an additional wellbore proximate the wellbore having the wellbore instrument therein, the electromagnetic transceiver in signal communication with the Earth's surface using an electrical cable.

17. The system of claim 16 wherein the wellbore instrument comprises a magnetic field sensor.

18. The system of claim 17 wherein the wellbore instrument is configured to determine a distance between the wellbore and the additional wellbore, and to encode the distance into a signal generated by the electromagnetic field generator associated therewith.

19. The system of claim 16 wherein the electromagnetic transceiver disposed in the additional wellbore is in signal communication with a signal generator at the Earth's surface using the electrical cable, wherein the wellbore instrument is configured to decode a signal generated by the signal generator at the Earth's surface.

* * * * *